3,242,189
PROCESSES FOR PREPARING 3-AMINO-
ISOXAZOLES
Hermann Bretschneider, Innsbruck-Arzl, and Egon Fitz and Wilhelm Klötzer, Innsbruck, Austria, assignors to Hoffmann-La Roche Inc., Nutley, N.J., a corporation of New Jersey
No Drawing. Filed July 20, 1964, Ser. No. 383,994
Claims priority, application Austria, Aug. 6, 1963, 9,706/63
3 Claims. (Cl. 260—307)

The present invention relates to a process for the preparation of 3-amino-isoxazoles. More particularly, it relates to processes for the preparation of 3-amino-isoxazoles of the formula

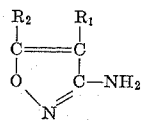

(I)

wherein $R_1$ and $R_2$ are hydrogen, alkyl, aralkyl or aryl.

The process of the invention is carried out by reacting an $\alpha,\beta$-dihalo carboxylic acid nitrile of the formula

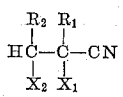

(IIa)

or an $\alpha,\beta$-unsaturated alpha-halo carboxylic acid nitrile of the formula

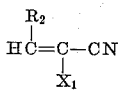

(IIb)

wherein in Formulas IIa and IIb $R_1$ and $R_2$ have the above meanings and $X_1$ and $X_2$ represent halogen atoms, with hydroxylamine or hydroxylamine substituted in the amino group. The reaction is carried out in alkaline medium whereby a cyclization reaction takes place to give a 3-amino-isoxazole of Formula I.

In the above formulas $R_1$ and $R_2$ are preferably lower alkyl groups, particularly those having from 1–6 carbon atoms, and can be either straight or branched chain. Methyl is most preferred, although ethyl, propyl, butyl, isobutyl, hexyl, etc. can also be employed. The aralkyl group is preferably phenyl lower alkyl e.g., benzyl, phenethyl, etc., and aryl is preferably phenyl. The $R_1$ and $R_2$ groups can be the same or different. They can, for example, both be hydrogen or both be the same or different alkyl groups, the same or different aralkyl groups, the same or different aryl groups, or one of the R groups can be hydrogen and the other an alkyl, aralkyl or aryl group, etc. $X_1$ and $X_2$ are preferably two identical halogen atoms, especially bromine or chlorine.

Examples of starting materials corresponding to Formulas IIa and IIb, which can be cyclized by the process of the invention include $\alpha,\beta$-dibromo-isobutyric acid nitrile and $\alpha$-bromo-crotonic acid nitrile. By the use of a monohalo-carboxylic acid nitrile of Formula IIb the cyclization product of Formula I, which is obtained, has hydrogen for the $R_1$ group.

The $\alpha,\beta$-dihalo-carboxylic acid nitriles of Formula IIa are preferred for use in the process of the invention. These compounds can readily be obtained from the corresponding $\alpha,\beta$-unsaturated-carboxylic acid nitrile through halogenation e.g., $\alpha,\beta$-dibromo-isobutyric acid nitrile can be prepared from methacrylic acid nitrile. The $\alpha,\beta$-unsaturated $\alpha$-monohalo compound of Formula IIb can, for example, be obtained from the $\alpha,\beta$-dihalo compounds of Formula IIa by removal of a molecule of hydrogen halide.

It is not necessary to isolate the dihalo or monohalo compounds of Formula IIa or IIb, prepared as above, for reaction with the hydroxylamine component. And, where the hydroxylamine component contains labile substituents, isolation is not desirable. Generally, the crude solution obtained from the preparation of the halogenated-carboxylic acid nitriles can be used directly for the cyclization reaction.

Free hydroxylamine can be employed in the process of the invention. There may be formed in certain cases (most readily with the use of compounds of Formula IIa wherein $R_1$ equals hydrogen), besides the 3-amino compounds of Formula I, the corresponding 5-amino isomers in minor amounts. The formation of these by-products is almost completely suppressed when an N-protected-hydroxylamine is employed, especially an N-acyl-hydroxylamine. The N-acyl-protecting group can be derived, for example, from aliphatic or aromatic carboxylic acids such as formic acid, acetic acid, propionic acid or benzoic acid. Accordingly, N-formyl-, N-acetyl- or N-benzoyl-hydroxylamine, for example, can be employed as the hydroxylamine components. An especially preferred N-acyl derivative of hydroxylamine is N-carbamoyl-hydroxylamine (hydroxy-urea). Use of this hydroxylamine derivative leads to an especially uniform course of reaction, proceeding specifically and in high yield to the 3-amino compounds of Formula I.

As is the case with the nitrile component, the hydroxylamine component need not be employed in pure form. In place of crystalline pure N-carbamoyl-hydroxylamine there can be used crude solutions thereof, such as are obtained in the preparation of this compound; for example, from hydroxylamine solutions containing carbamic acid ethyl ester and alkali hydroxides.

The cyclization operation can be carried out, for example, in aqueous, aqueous-lower alkanolic (e.g. aqueous-methanolic) or lower alkanolic solution. The required alkalinity of the reaction medium can be obtained by the addition of alkalis such as alkali-metal hydroxides, alkali-metal carbonates, or alkali-metal alcoholates (e.g. sodium or potassium hydroxide, sodium ethylate, etc.). Preferably, there is used about 3 moles of alkali per mole of dihalogeno-carboxylic acid nitrile (Formula IIa) and about 2 mole of alkali per mole of monohalogeno-carboxylic acid nitrile (Formula IIb).

According to a preferred method of carrying out the cyclization operation, the halogeno component (Formula IIa or IIb) is added, conveniently with cooling, to an aqueous-lower alkanolic solution of the hydroxylamine component. The reaction mixture is maintained (if necessary with the addition of an alkanol such as methanol), at approximately room temperature (preferably with stirring) and subsequently heated for a short time (conveniently at a temperature of about 80–100° C.). The resulting basic cyclization products can be separated from neutral impurities in the usual manner; for example, by extraction of the aqueous phase with ethyl acetate or another organic water-immiscible solvent (such as benzene, ether, etc.), treatment of the ethyl acetate extract with a mineral acid (e.g. 2-N hydrochloric acid, whereby the extracts of the basic portions are removed), saturation of the acidified aqueous solution with potassium carbonate, and then additional extraction with ethyl acetate.

The 3-amino-isoxazoles of Formula I obtained as the main product of the cyclization reaction can contain, as an impurity, small amounts of a cyclization by-product. This by-product is possibly a 4,5-dihydro-4-halogeno-isoxazole of the formula

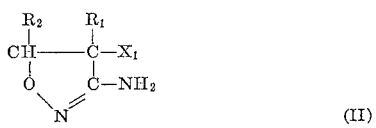

(II)

wherein $R_1$, $R_2$ and $X_1$ have the above significance.

Many of the isoxazoles of Formula I are new compounds, and these compounds comprise part of the instant invention. In particular, compounds of the following formulae are not known to the art:

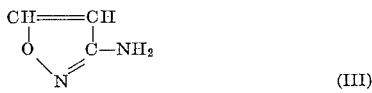

(III)

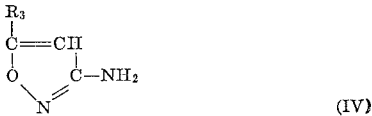

(IV)

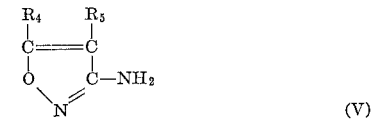

(V)

wherein, in the above formulae, $R_3$ is phenyl lower alkyl or phenyl, $R_4$ is hydrogen, phenyl lower alkyl or phenyl, and $R_5$ is lower alkyl.

The 3-amino-isoxazoles of Formula I, especially 3-amino-5-methyl-isoxazole, 3-amino-4-methyl-isoxazole, 3-amino-4,5-dimethyl-isoxazole or 3-amino-isoxazole, can be employed as intermediates for the preparation of chemotherapeutically active 3-sulphanilamido-$4R_1,5R_2$-isoxazoles which can be prepared by coupling a 3-amino-isoxazole of Formula I with a benzene sulfonyl-halide. The 3-suphanilamido-$4R_1,5R_2$-isoxazoles are useful as antibacterial agents in the same manner as known sulfonamides. The 3-amino-isoxazole of Formula I does not have to be isolated for the above coupling reaction, but can be employed in solution e.g., in benzene solution to which the benzene sulfonyl halide is added. Similarly, in all cases the present di-hydro-halo bases of Formula II do not have to be removed, since under the conditions of the coupling reaction dehydrohalogenation occurs particularly readily, so that the coupling product is predominantly halogen-free 3-sulphanilamido-$4R_1,5R_2$-isoxazole. The compounds of Formula II can, if desired, be converted to isoxazoles of Formula I by dihydrohalogenation according to known methods through alkaline reaction, suitably with heat.

*Example 1*

5 grams (0.075 mole) of freshly distilled crotonic acid nitrile are mixed with 6 ml. of absolute methanol and, while stirring and cooling with ice, treated dropwise with 12 g. (0.075 mole) of bromine. The mixture is kept for 12 hours at 0° C. and for a further 24 hours at 20° C. in the dark. Then the red-brown solution, which no longer contains bromine, is introduced dropwise in the course of 5 minutes while stirring into a solution of 9 g. (0.225 mole) of sodium hydroxide and 5.7 g. (0.075 mole) of N-carbamoyl-hydroxylamine in 50 ml. of water, while the internal temperature is maintained at 8° C. Then the mixture is shaken for 45 hours at 20° C., thereafter heated under reflux for 3 hours in a water-bath, and subsequently evaporated to dryness under reduced pressure. The last residue of water is azeotropically distilled off with benzene. Then the dry residue is extracted twice, each time, with 50 ml. of hot benzene, and the combined benzene extracts concentrated to ca. 40 ml. A crude benzene solution of 3-amino-5-methyl-isoxazole is thus obtained.

This crude benzene solution of 3-amino-5-methyl-isoxazole is reacted with p-acetamido-benzenesulphonyl chloride (in the presence of pyridine). Subsequent hydrolysis of the p-acetamido group yields 10.8 g. of pure 3-sulphanilamido-5-methyl-5-isoxazole.

*Example 2*

A solution of the sodium salt of N-carbamoyl-hydroxylamine (prepared from ethylurethane in accordance with Org. Syntheses 40, page 60; calculated content 11.4 g. of N-carbamoyl-hydroxylamine) is treated while stirring with 12 g. (0.3 mole) of sodium hydroxide in 20 ml. of water. At 8° C., a methanolic solution of crude α,β-di-bromo-butyric acid nitrile (prepared from 10 g. (0.15 mole) of crotonic acid nitrile, 12 ml. of absolute methanol and 24 g. (0.15 mole) of bromine) is added dropwise to the N-carbamoyl-hydroxylamine solution. The mixture is then shaken for 40 hours at 20° C. and heated for a further 3 hours at 90° C. The dry residue obtained after evaporation under reduced pressure is extracted twice with 100 ml. of benzene. The combined benzene extracts are concentrated to 80 ml. An aqueous benzene solution of crude 3-amino-5-methyl-isoxazole is obtained thereby, from which 20 g. of crude 3-sulphanilamido-5-methyl-isoxazole is obtained.

*Example 3*

To a solution of 7 g. (0.175 mole) of sodium hydroxide in 40 ml. of water are added portionwise at −10° C., 5.2 g. (0.075 mole) of hydroxylamine hydrochloride. 11.35 grams (0.05 mole) of crude α,β-dibromo-butyric acid nitrile are added thereto. The mixture is shaken for 48 hours at 20° C. Subsequently the undissolved oily portions are brought into solution with ethanol and the resulting solution heated for 3 hours in a hot water-bath. Thereupon the solution is saturated with potassium carbonate and the basic portions are isolated. 2.9 grams of a partially crystalline crude base-fraction (Beilstein test negative) is obtained. From 500 mg. of this crude base-fraction there are obtained by distillation under reduced pressure (0.2 mm., bath temperature 70° C.) 430 mg. of a distillate which crystallizes upon grinding, and shows a melting point of 65° C. On the basis of the thin-layer chromatogram, the distillate contains a mixture of 3-amino-5-methyl-isoxazole and 5-amino-3-methyl-isoxazole.

*Example 4*

(a) To a solution of 16 g. (0.4 mole) of sodium hydroxide in 100 ml. of water are added 15.2 g. (0.2 mole) of crystallized N-carbamoyl-hydroxylamine, and the mixture saturated with potassium carbonate. The resulting solution is treated with 45.5 g. (0.2 mole) of α,β-dibromo-butyric acid nitrile and shaken for 45 hours at 20° C. The separated inorganic salts are filtered off. The filtrate is homogenized with ethanol and divided into two equal portions.

(b) The first half is freed from ethanol under reduced pressure without temperature increase. After separation of the non-basic portions, there is obtained a bromine-containing base-fraction of 8.40 g. (Beilstein and Ehrlich reaction positive) which, besides 3-amino-5-methyl-isoxazole, also contains some amino-methyl-dihydro-bromo-isoxazole (very probably 3-amino-5-methyl 4,5-dihydro- 4-bromo-isoxazole). The base-fraction contains 17 percent bromine calculated for an amino-methyl-dihydro-bromo-isoxazole. 13.5 grams of crystalline 3-sulphanilamido-5-methyl isoxazole is obtained from the crude mixture of bases.

(c) In order to obtain a bromine-free crude base-fraction the second half of the filtrate obtained according to paragraph (a) is heated for 3 hours on the water-bath. The ethanol and part of the water is evaporated off. After the usual work up there are obtained 7.6 g. of base-fraction (from ethyl acetate) with a bromine content of only 1.8 percent of the bromine content calculated for an amino-methyl-dihydro-bromo-isoxazole. After recrystallation from benzene the base is bromine-free. The 3-amino-5-methyl-isoxazole thus obtained is free from the 5-amino-3-methyl-isomer. Yield 67 percent (based on N-carbamoyl-hydroxylamine).

Example 5

To a solution of 4 g. (0.1 mole) of sodium hydroxide in 25 ml. of water are added 6.9 g. (0.05 mole) of N-benzoyl-hydroxylamine and 11.4 g. (0.05 mole) of $\alpha,\beta$-dibromo-butyric acid nitrile and the mixture is shaken at 20° C. After 5 days the mixture is treated with 50 ml. of ethanol and heated for 2 hours on the water-bath. After separation of the non-basic portions there are obtained 1.5 g. of a crude base-fraction which is distillable to about 30 percent and, on the basis of the thin-layer chromatogram, contains 3-amino-5-methyl-isoxazole, and no 5-amino-3-methyl-isoxazole.

Example 6

A solution of 8 g. (0.2 mole) of sodium hydroxide and 7.6 g. (0.1 mole) of N-carbamoyl-hydroxylamine in 50 ml. of water is saturated with potassium carbonate. After the addition of 13.8 g. (0.1 mole) of $\alpha,\beta$-dichloro-butyric acid nitrile the mixture is shaken for three days at 20° C. Subsequently, the oil which is present is brought into solution by the addition of ethanol and the solution is heated for 3 hours in a water-bath (without reflux cooling). After the usual work up there are obtained 5.1 g. of a base-fraction which contains 3-amino-5-methyl-isoxazole, and some chlorine-containing dihydro-base (3-amino-5-methyl-4,5-dihydro-4-chloro-isoxazole). From 0.98 g. of the crude 3-amino-5-methyl-isoxazole, 1.93 g. of crude halogen free 3-sulphanilamido-5-methyl-isoxazole is obtained.

Example 7

A solution of crude $\alpha,\beta$-dibromo-butyric acid nitrile is prepared from 5 g. (0.075 mole) of crotonic acid nitrile, 6 ml. of absolute methanol and 12 g. (0.075 mole) of bromine. For the purpose of splitting off one molecule of hydrogen bromide, this solution is treated while cooling with a solution of 3 g. (0.075 mole) of sodium hydroxide in 20 ml. of water. After one hour the thus-obtained solution of crude $\alpha$-bromo-crotonic acid nitrile is added to a solution of 6 g. (0.15 mole) of sodium hydroxide and 5.7 g. (0.075 mole) of N-carbamoyl-hydroxylamine in 60 ml. of water. The mixture is shaken for 40 hours at 20° C., then heated for 2 hours in a boiling water-bath, and the basic portions are isolated as usual. There are thus obtained 5.5 g. of halogen-free and isomer-free 3-amino-5-methyl-isoxazole.

Example 8

To a solution of 8 g. (0.2 mole) of sodium hydroxide in 50 ml. of water are added 8.3 g. (0.1 mole) of N-acetyl-hydroxylamine ($CH_3CONHOH \cdot \frac{1}{2}H_2O$). The solution obtained is treated with 22.7 g. (0.1 mole) of $\alpha,\beta$-dibromo-butyric acid nitrile in 50 ml. of methanol and then additionally with a further 50 ml. of methanol. The homogeneous solution obtained is left to stand at 20° C., then heated for 2 hours in a boiling water-bath and then cooled. The base-mixture contained in the resulting solution is isolated by extraction with ethyl acetate. There are obtained from the ethyl acetate extract 4 g. of a base-mixture which contains chiefly 3-amino-5-methyl-isoxazole, and a bromine-containing base, but no 5-amino-3-methyl-isoxazole. This base-mixture is distillable to about 75° C. in the bulb-tube. The yellow oil which is obtained as the distillate partly crystallizes. The reaction for halogen according to Beilstein is still positive.

From 0.98 g. of the distilled base, by reaction with p-acetamido-benzenesulphonyl chloride, and treatment of the coupled product with sodium hydroxide, 1.15 g. of halogen-free 3-sulphanilamido-5-methyl-isoxazole is obtained. 3-sulphanilamido-5-methyl-isoxazole is precipitated from the alkaline solution through acidification. Yield: 1.15 g.; melting point: 164–170° C. The product is halogen-free.

Example 9

To a solution of 25 g. of sodium hydroxide in 120 ml. of water are added at 5° C. 15.2 g. of N-carbamoyl-hydroxylamine, and then while stirring 42.6 g. of $\alpha,\beta$-dibromo-propionic acid nitrile (obtained by bromination of acrylic acid nitrile). After completion of the addition of the dibromo compound the cooling is removed, whereafter the temperature rises to 30° C. After the fading away of the exothermic reaction the mixture is heated on a boiling water-bath. After cooling, the mixture is etherified, the ether dried and distilled off. In this manner are obtained 3.8 g. of an oily base-mixture containing 3-amino-isoxazole and a bromine-containing dihydro-isoxazole compound, possible 3-amino-4,5-dihydro-4-bromo-isoxazole.

Example 10

48 g. (1.2 mole) of sodium hydroxide and 30.4 g. (0.4 mole) of N-carbamoyl-hydroxylamine are dissolved in 40 ml. of water. The solution is cooled to 0° C. and treated with 90.8 g. of $\alpha,\beta$-dibromo-isobutyric acid nitrile (obtained by the bromination of methacrylic acid nitrile). The nitrile does not mix with the aqueous phase. Also, the mixture does not become homogeneous by the addition of 400 ml. of methanol. After 1 hour the external cooling is removed, whereupon the mixture self-heats slightly and finally becomes homogeneous. A yellow coloration simultaneously occurs. The alkaline solution is left to stand for 5 days at 20° C. and then heated at 90° C. for 2 hours. After extraction of the basic portions with ethyl acetate there are obtained 22 g. of crude bromine-free 3-amino-4-methyl-isoxazole. By recrystallization from benzene this substance is obtained in crystallized chromatographically-uniform form of melting point 45–50° C.

We claim:
1. A process for the preparation of an amino-isoxazole of the formula

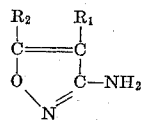

wherein $R_1$ and $R_2$ are selected from the group consisting of hydrogen, lower alkyl, phenyl lower alkyl, and phenyl comprising reacting a nitrile selected from the group consisting of (a) a nitrile of the formula

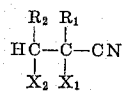

wherein $R_1$ and $R_2$ have the above meaning, and $X_1$ and $X_2$ are halogen, and (b) a nitrile of the formula

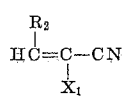

wherein $X_1$ and $R_2$ have the above meaning,
with a compound selected from the group consisting of
(a) hydroxylamine, and
(b) N-acylhydroxylamine
in an alkaline reaction medium.

2. A process according to claim 1 wherein said nitrile is $\alpha,\beta$-dibromobutyric acid nitrile.

3. A process according to claim 1 wherein the hydroxylamine is N-carbamoylhydroxylamine.

References Cited by the Examiner

UNITED STATES PATENTS 3,073,839   1/1963   Kano et al. _____ 260—307

OTHER REFERENCES

Elderfield, Heterocyclic Compounds, vol. 5 (New York, 1957), pages 472–473.

HENRY R. JILES, *Acting Primary Examiner.*

ALTON D. ROLLINS, *Assistant Examiner.*